(12) United States Patent
Li

(10) Patent No.: US 9,885,897 B2
(45) Date of Patent: Feb. 6, 2018

(54) FRONT FRAME OF LIQUID CRYSTAL DISPLAY AND METHOD OF FORMING THE SAME

(71) Applicant: Shenzhen China Star Optoelectronics Technology Co., Ltd., Shenzhen, Guangdong (CN)

(72) Inventor: Quan Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 211 days.

(21) Appl. No.: 14/890,457

(22) PCT Filed: Oct. 22, 2015

(86) PCT No.: PCT/CN2015/092531
§ 371 (c)(1),
(2) Date: Nov. 11, 2015

(87) PCT Pub. No.: WO2017/049691
PCT Pub. Date: Mar. 30, 2017

(65) Prior Publication Data
US 2017/0184907 A1    Jun. 29, 2017

(30) Foreign Application Priority Data
Sep. 22, 2015 (CN) .......................... 2015 1 0605163

(51) Int. Cl.
*G02F 1/1333* (2006.01)
*H01J 9/24* (2006.01)

(52) U.S. Cl.
CPC .......... *G02F 1/133308* (2013.01); *H01J 9/24* (2013.01); *G02F 2001/13332* (2013.01)

(58) Field of Classification Search
None
See application file for complete search history.

(56) References Cited

U.S. PATENT DOCUMENTS

2007/0132906 A1* 6/2007 Shen ................. G02F 1/133308
349/58

FOREIGN PATENT DOCUMENTS

| CN | 101162330 A | 4/2008 |
|---|---|---|
| CN | 101598861 A | 12/2009 |
| CN | 101739899 A | 6/2010 |
| CN | 101923239 A | 12/2010 |
| CN | 101739899 A | 6/2016 |
| WO | WO2014196266 A1 | 4/2014 |

* cited by examiner

*Primary Examiner* — Richard Kim
(74) *Attorney, Agent, or Firm* — Andrew C. Cheng

(57) ABSTRACT

A method of forming a front frame of an LCD includes: providing a rectangle frame; disposing bending lines on the side frames of the rectangle frame; adhering a layer of buffering material to the part of the side frame that is on the inner side of the bending line, where the part of the side frame that is on the inner side of the bending line refers to the part of the side frame that is between the bending line and the inner edge of the side frame; and stamping and bending the rectangle frame along the bending line. The present invention can align the layer of buffering material with the inner edge of the side frame so that the layer of buffering material does not extend to the open area of the front frame, therefore does not affect the display of the liquid crystal panel.

8 Claims, 4 Drawing Sheets

FRONT FRAME OF LIQUID CRYSTAL DISPLAY AND METHOD OF FORMING THE SAME

BACKGROUND OF THE INVENTION

1. Field of the Invention

The present invention relates to mechanical processing, and more specifically, to a front frame used in a liquid crystal display (LCD) and a method of forming the same.

2. Description of the Prior Art

The evolution of photoelectric and semiconductor technology spurs the thriving development of flat panel display. Among a variety of flat panel displays, LCD has become the mainstream in the market as it is characterized by several quality features, such as high space utilization efficiency, low energy consumption rate, zero radiation and low electromagnetic interference.

A LCD usually needs a front frame to fix the liquid crystal panel with a backlight module. In order to prevent light leakage and protect the liquid crystal panel, a layer of buffering materials such as foam is usually adhered to the interface where the front frame touches the liquid crystal panel. With current technology, the layer of buffering materials is usually adhered to the interface where the front frame touches the liquid crystal panel after the front frame has been processed.

However, the development of ultra-narrow-frame LCD has pushed the frame width to be thinner than 1.5 mm, and it will only go thinner in the future. Such trend will make adhering the layer of buffering material on to the front frame even more difficult. It will be hard to match the position and the materials will easily extend beyond the open of the front frame, affecting the display of the liquid crystal panel.

SUMMARY OF THE INVENTION

According to the present invention, a method of forming a front frame of a liquid crystal display (LCD) comprises: providing a rectangle frame; disposing bending lines on the side frames of the rectangle frame; adhering a layer of buffering material to the part of the side frame that is on the inner side of the bending line, wherein the part of the side frame that is on the inner side of the bending line refers to the part of the side frame that is between the bending line and the inner edge of the side frame; and stamping and bending the rectangle frame along the bending line.

Furthermore, steps of adhering the layer of buffering material to the part of the side frame that is on the inner side of the bending line comprise extending the layer of buffering material beyond the inner edge of the side frame.

Furthermore, steps of adhering the layer of buffering material to the area on the inner side of the bending line comprise leaving a space between the layer of buffering material and the bending line.

Furthermore, steps before stamping and bending the rectangle frame along the bending line further comprise cutting along the inner edge of the side frame to remove the part of the layer of buffering material that extends beyond the inner edge of the side frame.

Furthermore, steps before stamping and bending the rectangle frame along the bending line further comprise disposing cutting lines for the neighboring inner edge of the side frame on the layer of buffering material, and cutting along the cutting line to remove the part of the side frame and layer of buffering material that is between the cutting line and the inner edge.

Furthermore, steps of stamping and bending the rectangle frame along the bending line comprise making the part of the side frame on the outer side of the bending line and the part of the side frame on the inner side of the bending line bending to each other; wherein the part of the side frame on the outer side of the bending line refers to the part of the side frame that is between the bending line and the outer edge of the side frame.

According to the present invention, a front frame that is used in a LCD is provided. The front frame is formed by the method as disclosed above.

The present invention proposes a method of forming a front frame which completes the adhering of the layer of buffering material during the forming process so to simplify the adhering of the layer of buffering material. The layer of buffering material will be able to align accurately to the inner edge of side frames and will not extend beyond the open of the front frame, therefore will not affect the display of the LCD.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF PREFERRED EMBODIMENTS

Figure 1:
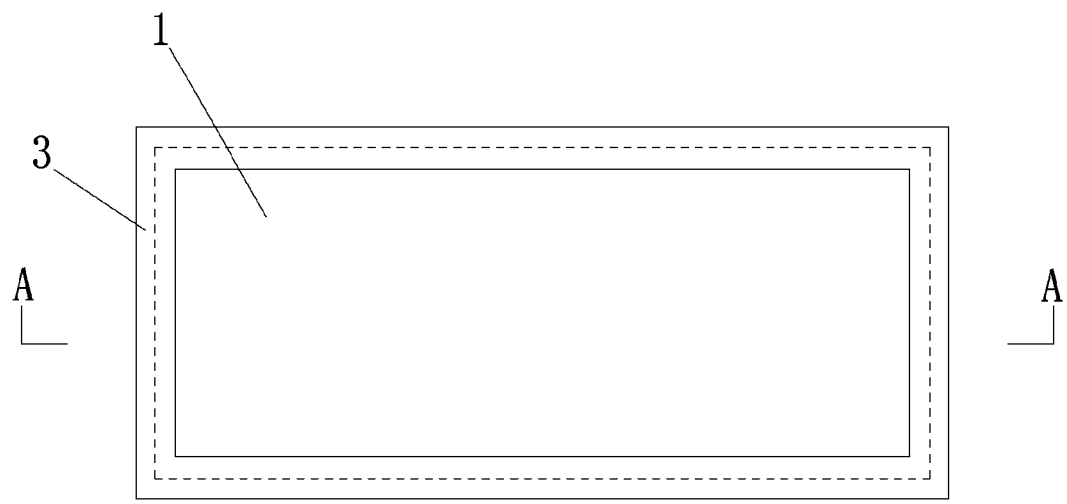
FIG. 1 is a plan view of a LCD of an embodiment of the present invention.

The accompanying drawings are included to provide a further understanding of the invention, and are incorporated in and constitute a part of this specification. The drawings illustrate embodiments of the invention and, together with the description, serve to explain the principles of the invention.

For clarify, thicknesses of the layers and areas in the drawings are exaggerated. The invention is described below in detail with reference to the accompanying drawings, wherein like reference numerals are used to identify like elements illustrated in one or more of the figures thereof, and in which exemplary embodiments of the invention are shown.

Figure 2:
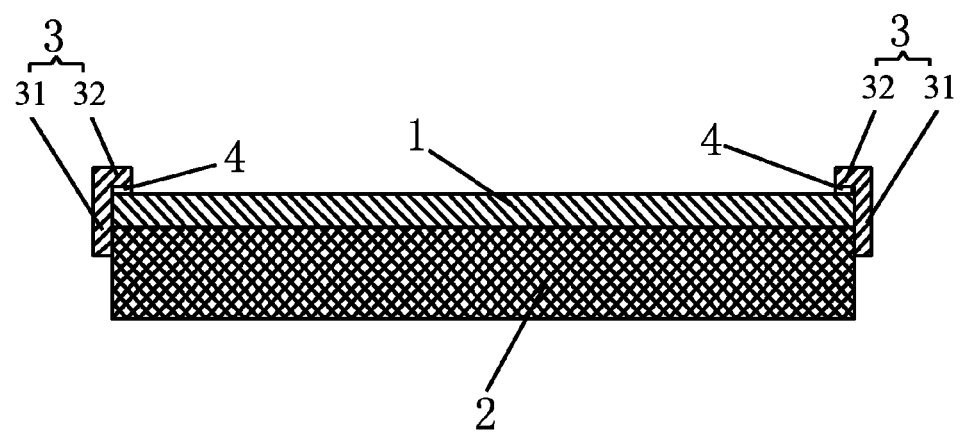
FIG. 2 is a cross-sectional view along the line from A to A in FIG. 1.

FIG. 1 is a plan view of a LCD of an embodiment of the present invention. FIG. 2 is a cross-sectional view along the line from A to A in FIG. 1.

Please refer to both FIG. 1 and FIG. 2. The LCD of the embodiment of the present invention comprises a liquid crystal panel 1, a backlight module 2 and a front frame 3. The liquid crystal panel 1 and backlight module 2 are disposed opposite to each other so that the backlight module 2 can provide backlight to the liquid crystal panel 1. The front frame 3 fixes the liquid crystal panel 1 and backlight module 2 together, so to form a LCD. Please refer to relevant existing technology for specific structure of the liquid crystal panel 1 and backlight module 2. No further explanation is provided here. The following text provides a detailed description about the front farm 3 of the embodiment of the present invention.

Figure 3:
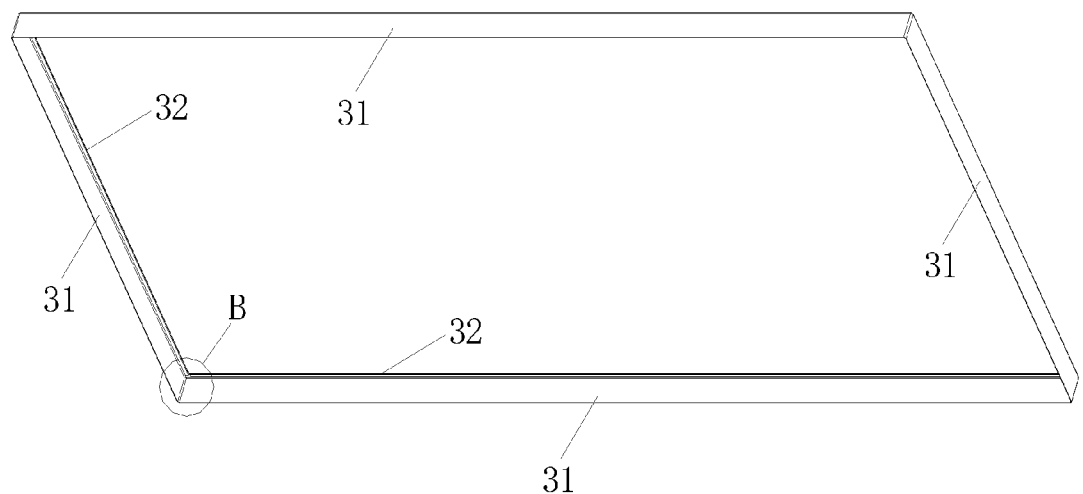
FIG. 3 is a perspective view of the front frame of the embodiment of the present invention.
Figure 4:
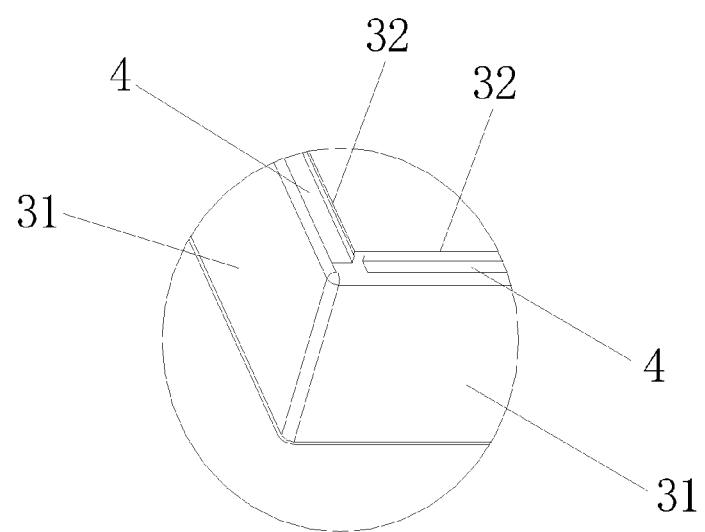
FIG. 4 is a magnified view of part B in FIG. 3.

FIG. 3 is a perspective view of the front frame of the embodiment of the present invention. FIG. 4 is a magnified view of part B in FIG. 3.

Please refer to FIG. 3 and FIG. 4. The front frame 3 of the embodiment of the present invention comprises four connecting parts 31 and four pinching parts 32.

Specifically, the four connecting parts 31 and four pinching parts 32 are shaped as flat plates. Two flat-plate connecting parts 31 are connected with the other two flat-plate connecting parts. An open side of each connecting part 31 bends to the opposite connecting part 31 and forms a corresponding pinching part 32. So, two flat-plate pinching parts 32 are connected to the other two pinching parts. Each connecting part 31 is approximately perpendicular to its corresponding pinching part 32. The open side of the connecting part 31 refers to one of the sides that are not connected to the neighboring connecting part 31.

An area formed by the inner edge of the four pinching parts 32 is an open area of the front frame 3. When the front frame 3 fixes the crystal display panel 1 and the backlight module 2 together, the crystal display panel 1 shows images through the open area. The inner edge of the pinching parts 32 refers to the edge of a pinching part 32 which is not connected to the corresponding connecting part 31.

Please refer to FIG. 2 to FIG. 4. The pinching parts 32 of the front frame 3 pinch on the liquid crystal penal 1. The connecting parts 31 of the front frame 3 connect to the backlight module 2. For example, the connecting parts 31 of the front frame 3 connect with the back frame (not shown in figures) of the backlight module 2, so that the liquid crystal panel 1 and the backlight module 2 is fixed together.

In the present embodiment, the front frame 3 is usually made of aluminum alloy or titanium alloy. In order to prevent the front frame 3 from scratching the liquid crystal panel 1, the present embodiment applies a layer of buffering material 4 between the pinching parts 32 and the liquid crystal panel 1. In most cases, the layer of buffering material 4 is adhered in advance to a surface of the pinching parts 32 where it pinches on to the liquid crystal panel 1.

The following text provides a detailed description about the method of forming the front frame 3 of the present embodiment of the present invention. FIG. 5a to FIG. 5d is a flow chart based on the method of forming the front frame of the present embodiment of the present invention.

Figure 5A:
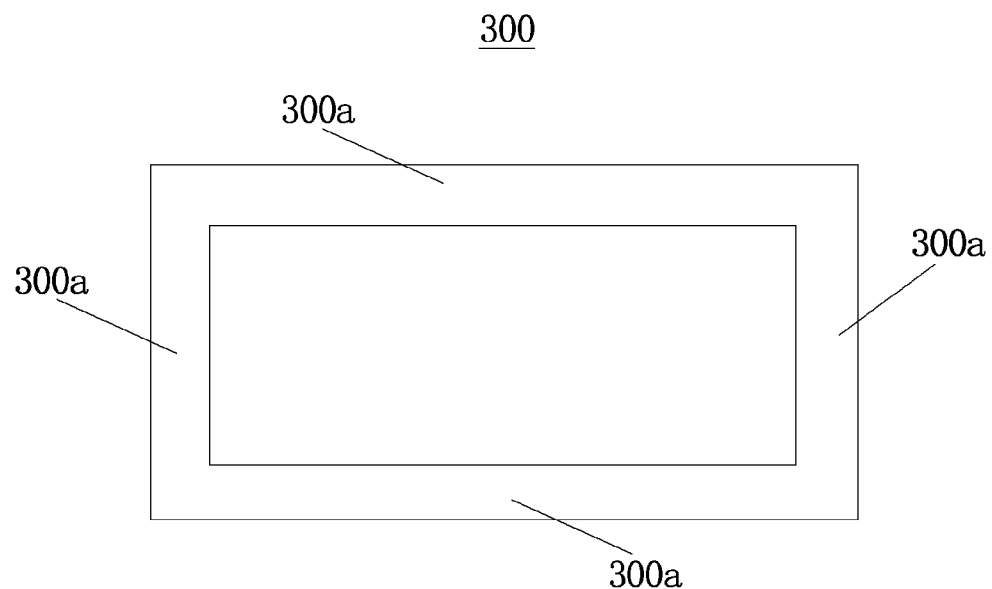
FIG. 5a to FIG. 5d is a flow chart based on the method of forming the front frame of the present embodiment of the present invention.

In FIG. 5a, a rectangle frame 300 is provided. The rectangle frame 300 is made of aluminum alloy or titanium alloy. Furthermore, the rectangle frame 300 is formed by four flat-plate side frames 300a, two long side frames facing each other and two short side frames facing each other, connecting into a rectangle.

Figure 5B:
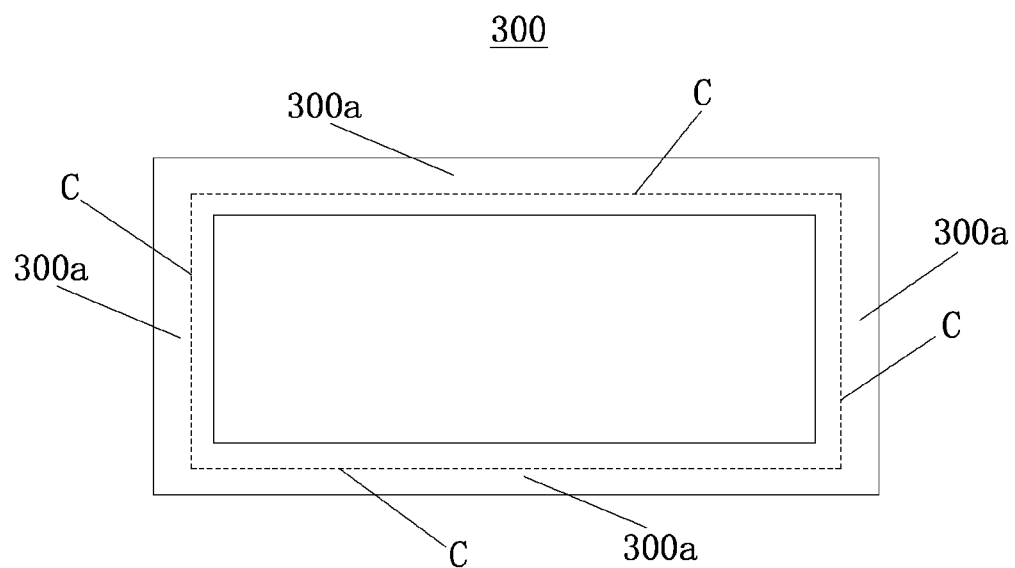

In FIG. 5b, each side frame 300a is disposed with a bending line C (shown as a dotted line on the side frame 300a). The bending line C on all four side frames 300a are also connecting into a rectangle.

Figure 5C:
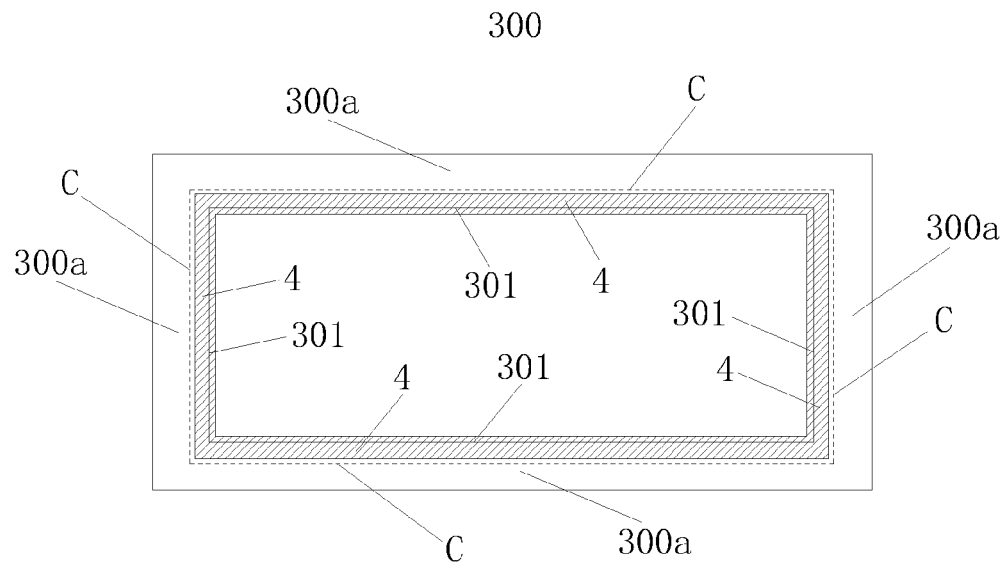

In FIG. 5c, a layer of buffering material 4 is adhered to the inner side of the bending lines C on the side frames 300a. The inner side of the bending line C on the side frame 300a refers to the part of the side frame 300a between the inner edge 301 and the bending line C.

Furthermore, when adhering the layer of buffering material 4, as shown in FIG. 5c, the layer of buffering material 4 must extend beyond the inner edge 301 of the side frame 300a. Moreover, when adhering the layer of buffering material 4, a space must be designated between the layer of buffering material 4 and the bending line C.

Figure 5D:
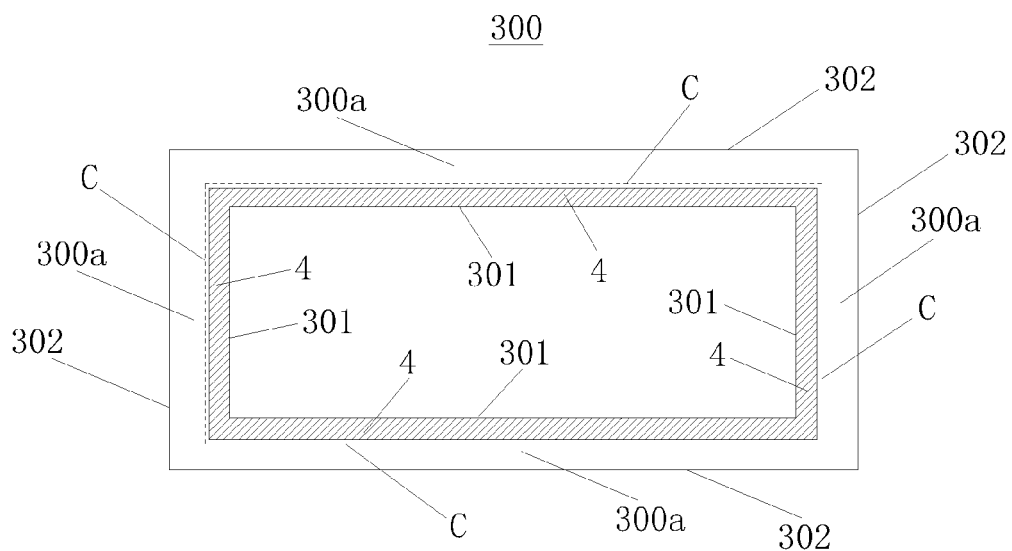

In FIG. 5d, remove the part of the layer of buffering material 4 that goes beyond the inner edge 301 of the side frame 300a, so that the layer of buffering material 4 is aligned with the inner edge 301. It prevents the problem with existing technology that the layer of buffering material 4 extends beyond the inner edge 301 of the side frame 300a into the open area of the front frame 3, which affects the display effect of the liquid display panel 1.

Two methods can be applied to remove the layer of buffering material 4. The first method is to cut along the inner edge 301 and remove the part of the layer of buffering material 4 that extends beyond the inner edge 301 of the side frame 300a. The second method is to dispose a cutting line on each side frame 300a, and cut along the cutting line and remove the layer of buffering material 4 and side frame 300a between the cutting line and the inner edge 301. With the second method, it is also acceptable if the layer of buffering material 4 in FIG. 5c does not extend beyond the inner edge 301 of the corresponding side frame 300a.

In addition, other suitable methods can also be applied so that the layer of buffering material 4 is aligned with the inner edge 301 when adhering the layer of buffering material 4. In this case, the step of cutting shown in FIG. 5d can be omitted.

Lastly, stamping the rectangle frame 300 along the bending line C, so that the part of the side frame 300a that is on the outer side of the bending line C, and the part of the side frame 300a that is on the inner side of the bending line C are bending to each other, forming the front frame 3 shown in FIG. 3. The part of the side frame 300a that is on the outer side of the bending line C is the connecting part 31 of the front frame 3, and the part of the side frame 300a that is on the inner side of the bending line C is the pinching part 32 of the front frame 3. The part of the side frame 300a that is on the outer side of the bending line C refers to the part of the side frame 300a that is between an outer edge 302 and the bending line C.

To sum up, the embodiment of the present invention completes the adhering of the layer of buffering material during the process of forming the front frame so to simplify the adhering of the layer of buffering material. The embodiment of the present invention can further align the layer of buffering material with the inner edge of the side frame so that the layer of buffering material does not extend to the open area of the front frame, therefore does not affect the display of the liquid crystal panel.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of forming a front frame of a liquid crystal display (LCD), comprising:
   providing a rectangle frame;
   disposing bending lines on the side frames of the rectangle frame;

adhering a layer of buffering material to the part of the side frame that is on the inner side of the bending line, wherein the part of the side frame that is on the inner side of the bending line refers to the part of the side frame that is between the bending line and the inner edge of the side frame; and stamping and bending the rectangle frame along the bending line.

2. The method of claim 1, wherein steps of adhering the layer of buffering material to the part of the side frame that is on the inner side of the bending line comprise extending the layer of buffering material beyond the inner edge of the side frame.

3. The method of claim 2, wherein steps of adhering the layer of buffering material to the area on the inner side of the bending line comprise leaving a space between the layer of buffering material and the bending line.

4. The method of claim 2, wherein steps before stamping and bending the rectangle frame along the bending line further comprise cutting along the inner edge of the side frame to remove the part of the layer of buffering material that extends beyond the inner edge of the side frame.

5. The method of claim 2, wherein steps before stamping and bending the rectangle frame along the bending line further comprise disposing cutting lines for the neighboring inner edge of the side frame on the layer of buffering material, and cutting along the cutting line to remove the part of the side frame and layer of buffering material that is between the cutting line and the inner edge.

6. The method of claim 1, wherein steps of adhering the layer of buffering material to the area on the inner side of the bending line comprise leaving a space between the layer of buffering material and the bending line.

7. The forming method of claim 1, wherein steps of stamping and bending the rectangle frame along the bending line comprise making the part of the side frame on the outer side of the bending line and the part of the side frame on the inner side of the bending line bending to each other; wherein the part of the side frame on the outer side of the bending line refers to the part of the side frame that is between the bending line and the outer edge of the side frame.

8. A front frame that is used in a LCD, wherein the front frame is formed by the method as claimed in claim 1.

* * * * *